July 26, 1932.  H. G. JOHNSON  1,868,663
THREAD MEASURING MECHANISM
Filed Jan. 24, 1928  2 Sheets-Sheet 1
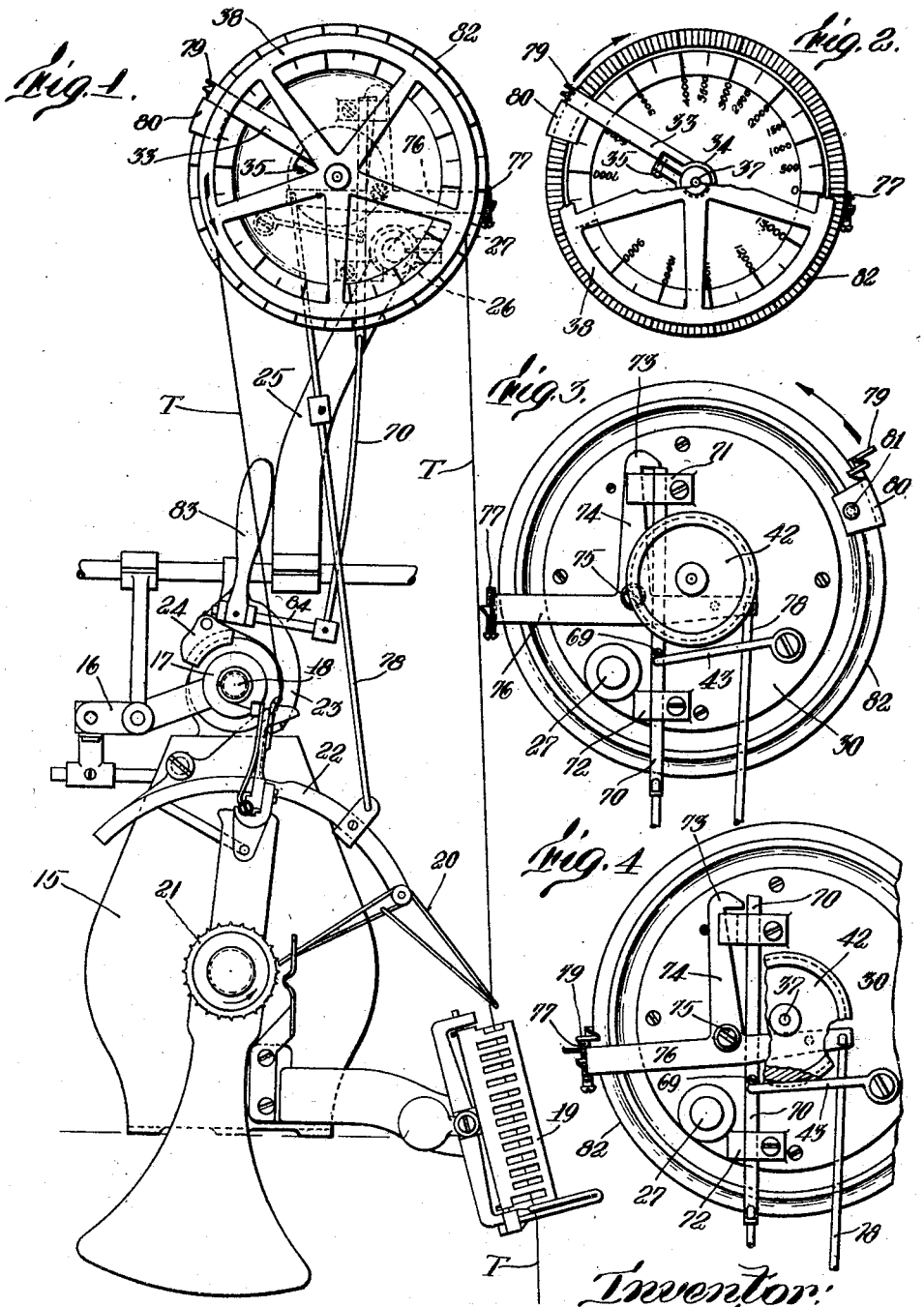
Inventor:
Henry G. Johnson,
by Knight Brown Quinby May
Attys.

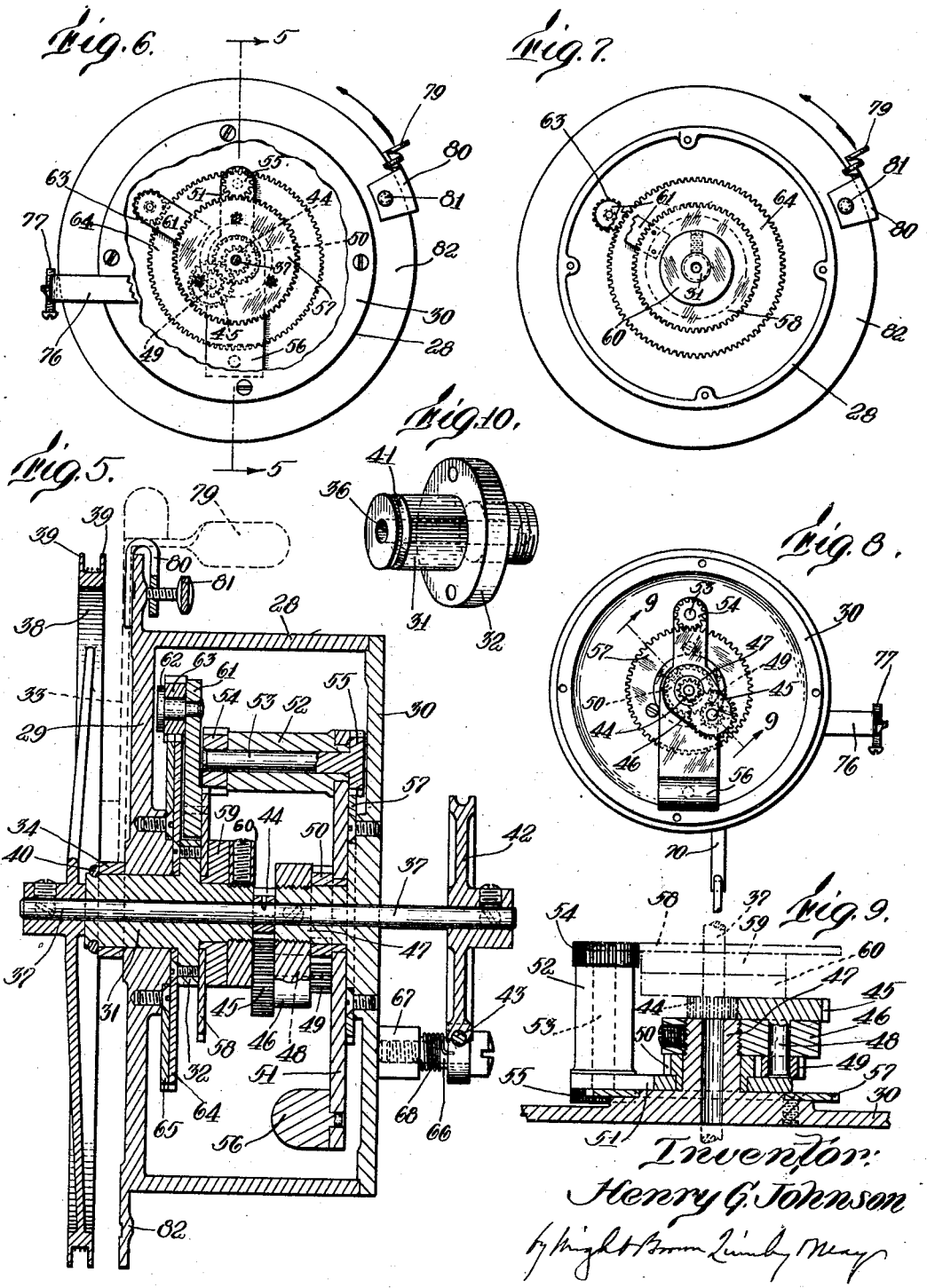

Patented July 26, 1932

1,868,663

UNITED STATES PATENT OFFICE

HENRY G. JOHNSON, OF EAST HAMPTON, CONNECTICUT, ASSIGNOR TO SUMMIT THREAD COMPANY, OF EAST HAMPTON, CONNECTICUT, A CORPORATION OF MAINE

THREAD MEASURING MECHANISM

Application filed January 24, 1928. Serial No. 249,053.

This invention relates to mechanism for measuring a traveling thread and for stopping the travel after any predetermined length of thread has passed the mechanism. My invention is particularly useful in conjunction with winding machines such for example as wind thread from spools onto cones or tubes. As the thread bodies are usually thus wound for the purpose of sale, it is essential that there be full yardage of thread on each cone or tube. On account of the unreliability of measuring devices heretofore in use, it has been considered necessary to add a certain percentage to the measured yardage to insure full measure in case the meter should indicate more than the actual yardage wound. This added percentage results in considerable loss to the manufacturer and does not remove the uncertainty of the actual yardage in a thread body. It is an object of this invention to supply a meter which is relatively simple in construction and is capable of accurate measurement.

For a more complete understanding of this invention, reference may be had to the accompanying drawings, of which,—

Figure 1 is an end elevation of a portion of a thread winding mechanism including an embodiment of the invention.

Figure 2 is a face view of a thread measuring mechanism with a portion broken away.

Figure 3 is a rear view of the measuring mechanism.

Figure 4 is another rear view of the measuring mechanism showing the parts in a different position of operation.

Figure 5 is a longitudinal section of the measuring mechanism.

Figure 6 is a rear elevation of the measuring mechanism, a portion of the casing being broken away to show the gearing within.

Figure 7 is a rear elevation of the casing showing the gears carried by the front wall thereof.

Figure 8 is an elevation of the inside face of the rear wall of the casing, showing the gears carried thereby.

Figure 9 is a section on the line 9—9 of Figure 8.

Figure 10 is a perspective view of one of the working parts.

Referring to the drawings in detail, a portion of the frame of a thread-winding machine is indicated at 15. This frame supports traversing mechanism, parts of which are generally indicated at 16, to guide a thread T on to a cop 17 which is rotated on a horizontal spindle 18 in a manner well known in the art. The thread T may be drawn from a supply spool, not shown, through a suitable tension device 19 and thence through an end of a stop lever arm 20 which is actuable by the motion of a stopping wheel 21 to swing a segment 22 when the thread is broken, the movement of the segment 22 resulting in the tripping of a brake arm 23 and the application of a brake 24 to stop the rotation of the spindle 18. At the same time, the spindle is released from the driving means by the simultaneous throwing up of a clutch, not shown, in a manner well known in the art. In order to measure the thread which is wound upon a cop 17, a measuring device may be mounted above the winder as by a bracket 25. At the upper end of the bracket 25, clamping means, such as a split collar 26, may be provided to seize a stud 27 which projects from the rear face of the measuring mechanism. As shown in Figure 5, the measuring mechanism may comprise a cylindrical casing 28 having a front wall 29 integral therewith and a removable rear plate 30. The front wall 29, as shown, is perforated centrally to receive a sleeve 31 which is formed with a radial flange 32 intermediate the ends thereof. A portion of the sleeve 31 projects forwardly of the front face of the wall 29, and on this projecting portion is mounted a suitable pointer 33 which is provided with a hub portion 34 comprising preferably a split collar with a set screw 35 by which the indicator 33 may be adjustably clamped to the sleeve 31 so as to be turned thereon with difficulty. The sleeve 31 is provided with an axial bore 36 through which extends a shaft 37 on the forward end of which a light wheel 38 is fixed. The rim of the wheel 38 is preferably supplied with a pair of radial flanges 39 forming a peripheral channel to receive one or more turns of the thread which is to be measured. As shown in Figure 5, the hub of the wheel 38 abuts the forward end of the sleeve 31, and the hub 34 of the indicator 33 is retained on the projecting portion of the sleeve 31 as by a split ring 40 which snaps into a suitable groove 41 adjacent the forward end of the sleeve. The shaft 37 projects rearwardly through the rear plate 30, and on its rear end portion is mounted a small wheel 42 which is adapted to cooperate with a braking member 43 to stop the rotation of the wheel 38 when the winding mechanism is stopped, as will be described. Within the casing 28 and rearwardly of the sleeve 31, a pinion 44 is mounted on the shaft 37. This pinion meshes with a gear 45 which is carried by an arm 46, this arm being rigidly fixed to a boss 47 projecting forwardly from the central portion of the rear plate 30. The gear 45 is fixed to a short shaft 48 which extends through the arm 46 on the other end of which is fixed a pinion 49. The pinion 49 meshes with a gear 50 which is loosely mounted on the boss 47. To the gear 50 is fixed an arm 51 at its central portion, this arm being thus arranged to swing about the boss 47 with the gear 50. At one end of the arm 51 is mounted an elongated bushing 52 which carries a shaft 53 rotatable therein. At one end of the shaft 53 is a pinion 54, while at the other end is fixed a pinion 55, the pinions 54 and 55 being preferably of the same size. At the opposite end of the arm 51 is mounted a suitable counterweight 56. The pinion 55 meshes with a gear 57 which is fixed against a raised portion of the rear plate 30 and which is coaxial with the boss 47 so that as the arm 51 swings around the boss, the pinion 55 rotates by reason of its engagement with the fixed gear 57. The pinion 54 meshes with a gear 58 which is carried by a collar 59 which is loosely mounted on the sleeve 31. A collar 60 abuts the collar 59 and is fixed to the rear end portion of the sleeve 31, cooperating with the flange 32 to hold the collar 59 in place. Fixed to the gear 58 and extending radially beyond the periphery thereof is an arm 61 which carries near its end a pin 62 on which is loosely mounted a pinion 63. This pinion meshes with two gears 64, 65 which are in face-to-face contact, are of the same diameter, but have different numbers of teeth. The gear 65 for example may be provided with one more tooth than the gear 64 so that with each revolution of the arm 61, the engagement of the pinion 63 with the gears 64, 65 results in an advance of the gear 64 by one tooth, since the gear 65 is fixed to the front wall 29 of the casing 28, while the gear 64 is secured to the flange 32 of the sleeve 31 and rotatable therewith. Thus each revolution of the arm 61 causes a slight advance of the sleeve 31 which carries the indicator 33. The rotation of the arm 61 is accomplished by the engagement of the pinions 54, 55, respectively, with the gears 58, 57, the latter having equal diameters but different numbers of teeth. The pinions are preferably provided with an equal number of teeth, whereas the gears 58, 57 may differ by one tooth, so that each revolution of the arm 51 results in the advance of the gear 58 through a distance represented by one tooth, since the gear 57 is fixed to the rear plate 30. The motion of the arm 51 is effected by the meshed relation of the pinion 44 with the gear 45, and the pinion 49 with the gear 50, it being noted that the pinion 44 is fixed to the shaft 37, while the gear 50 is fixed to the arm 51. Thus several of the revolutions of the shaft 37 are required for a single revolution of the arm 51, and as many revolutions of the arm 51 are required for the revolution of the arm 61 as there are teeth in the gear 58. Likewise there will be required the same number of revolutions of the arm 61 to produce one revolution of the sleeve 31 as there are teeth in the gear 64. Hence by this gearing, all of which is supported by the front and rear walls of the casing, a great reduction in the rate of rotation is obtained between the shaft 37 which carries the wheel 38, and the sleeve 31 which carries the indicator 33.

In order to stop the measuring mechanism as well as the winding mechanism when the thread T is broken or when a predetermined length of thread has been wound upon the cop 17, a braking mechanism is provided comprising a braking member 43 which is adapted to engage a wheel 42 fixed to the shaft 37. The braking arm 43 is preferably mounted loosely on a stud 66 which is set in a boss 67 extending rearwardly from the rear plate 30. A suitable spring 68 may be provided as shown in Figure 5 to press the arm 43 toward the rim of the wheel 42. During the operation of the mechanism, the arm 43 may be held away from the rim of the wheel 42 against the pressure of the spring 68 as by a pin 69 carried in a rod 70 which as shown in Figures 3 and 4 is adapted to slide longitudinally across the rear face of the casing, being guided by suitable guide members 71, 72. When the rod 70 is retained in its lower position, as shown in Figure 3, the brake 43 is retained in its off position, but when the rod 70 is released, the brake 43 is allowed to press against the wheel 42 as the rod 70 rises. In order to retain the rod 70 in its lowered position during the operation of the machine, a catch 73 is provided to engage over the upper end of the rod 70 as shown in Figure 3. The catch 73 may be located at the end of an arm 74 which is pivoted as at 75, this arm being integral with a cross arm 76 which extends in both directions on the pivot, one end carrying a stop member 77, the other end having attached thereto a stop rod 78. As shown in Figure 1, the rod 78 is attached at its lower end to the segment 22 so that when the stop arm 20 is released by a breaking of the thread T, not only is the brake 24 applied to stop the rotation of the cop 17, but the brake 43 is also applied at the same time to stop the rotation of the measuring device, since the upward push on the rod 78 rocks the arm 76 on its pivot and trips the catch 73, thus allowing the rod 70 to move upwardly and permitting the brake 43 to engage the periphery of the wheel 42. The brakes may also be applied by movement of the stop member 77 in such a way as to release the catch 73. The indicator arm 33 is provided at its outer end with a flat finger 79 which is so arranged that as it moves about the periphery of the dial on the front wall 29 on the casing 28, it will encounter the stop member 77. By calibrating the dial so that the zero point corresponds with the position of the stop member 77, as shown in Figure 2, it is apparent that if the indicator 33 is adjusted before the winding begins at a mark indicating the number of yards to be wound, then the actuation of the measuring mechanism by the passage of the thread over the wheel 38 will move the finger 79 toward the stop member 77. When the indicated yardage has been wound on the cop, the finger 79 will at that moment engage the stop 77 and will trip the catch 73, releasing the rod 70 and permitting the brakes to be applied to the measuring mechanism and to the spindle. Thus the amount of yardage to be wound on a spool may be easily predetermined by setting the indicator arm 33 on the dial scale mark corresponding to the yardage desired. If a number of cops are to be wound in succession with the same yardage, the setting of the indicator arm 33 may be facilitated by means of a gage clamp 80 which may comprise a simple U-shaped member as shown in Figure 5 with a set screw 81 by which it may be clamped tightly to a radially projecting flange 82 formed on the front wall 29.

In order to start the machine in operation, the indicator arm 33 is set to the desired yardage on the dial, the thread to be wound is led through the tension member 19 around the wheel 38, through the traverse guide, and on the cop. The brakes 24 and 43 may then be released simultaneously with the throwing in of the clutch which connects the spindle 18 with the driving means, by actuation of a starting lever 83. Actuation of this lever rocks an arm 84 to which the lower end of the rod 70 is fixed, thus pulling the rod 70 downwardly and drawing the brake 43 away from the periphery of the wheel 42. The catch 73 thereupon engages over the upper end of the rod 70 and holds it in its lowered position. The actuation of the starting lever 83 also removes the brake 24 from the spindle base and permits its rotation by driving means not shown on the drawing, but well known in the art. As the brake 24 is released the brake arm 23 is rocked, permitting the segment 22 to descend to its normal operating position as shown in Figure 1, wherein it holds the catch 73 in engagement with the end of the rod 70 by its connection therewith through the rod 78 and the arm 76.

Having thus described certain embodiments of my invention, it should be evident to those skilled in the art that various changes and modifications might be made therein without departing from its spirit or scope as defined by the appended claims.

I claim:—

1. A device of the class described, comprising a casing having a graduated dial on a face thereof, a shaft extending through said casing and dial and rotatable in the casing, a wheel mounted on said shaft and having a rim formed to hold a turn of traveling thread for rotating the wheel, a sleeve loosely mounted on said shaft and extending through said dial, an arm adjustably mounted on said sleeve for rotation therewith over said dial, said arm having an index to cooperate with said dial, reduction gearing operatively connecting said shaft and sleeve for slow rotation of the sleeve, a brake operable to apply a frictional drag against rotation of said shaft, brake-applying means, and means including a tripping member in the path of said arm for rendering said brake-applying means operative.

2. A device of the class described, comprising a casing having a dial thereon, a shaft extending through said casing and dial and rotatable in the casing, a wheel mounted on said shaft, a sleeve loosely mounted on said shaft and journaled in the casing wall bearing said dial, an index arm frictionally mounted on said sleeve to rotate therewith but to be adjustable thereon, said arm extending radially beyond the edge of said dial, reduction gearing within said casing operatively connecting said wheel with said sleeve, a brake associated with said shaft, means for applying said brake means including a tripping member at a definite point in the path of said arm for rendering said brake-applying means operative, and a gage member adjustably secured to the edge of said dial to limit the adjustment of the arm from said tripping member.

3. A device of the class described comprising a shaft, a wheel mounted on said shaft and shaped to hold a turn of traveling thread for rotating the wheel, a member having a dial, an index arm, a train of gearing connecting said arm with said shaft whereby said arm may indicate on said dial the length of thread passing over said wheel, a brake wheel mounted on said shaft, a brake adapted to engage said brake wheel, a spring pressing said brake toward engagement with said brake wheel, a detent normally holding said brake away from said brake wheel, a pivoted catch member engageable with said detent to retain it in normal position, said catch member having a portion disposed in the path of said index arm and movable by engagement with said arm to rock the catch member and release said detent, and mechanism including a member in contact with the thread, said last named member being connected to said catch member for rocking it in response to a breaking of said traveling thread.

In testimony whereof I have affixed my signature.

HENRY G. JOHNSON.